Patented Feb. 6, 1951

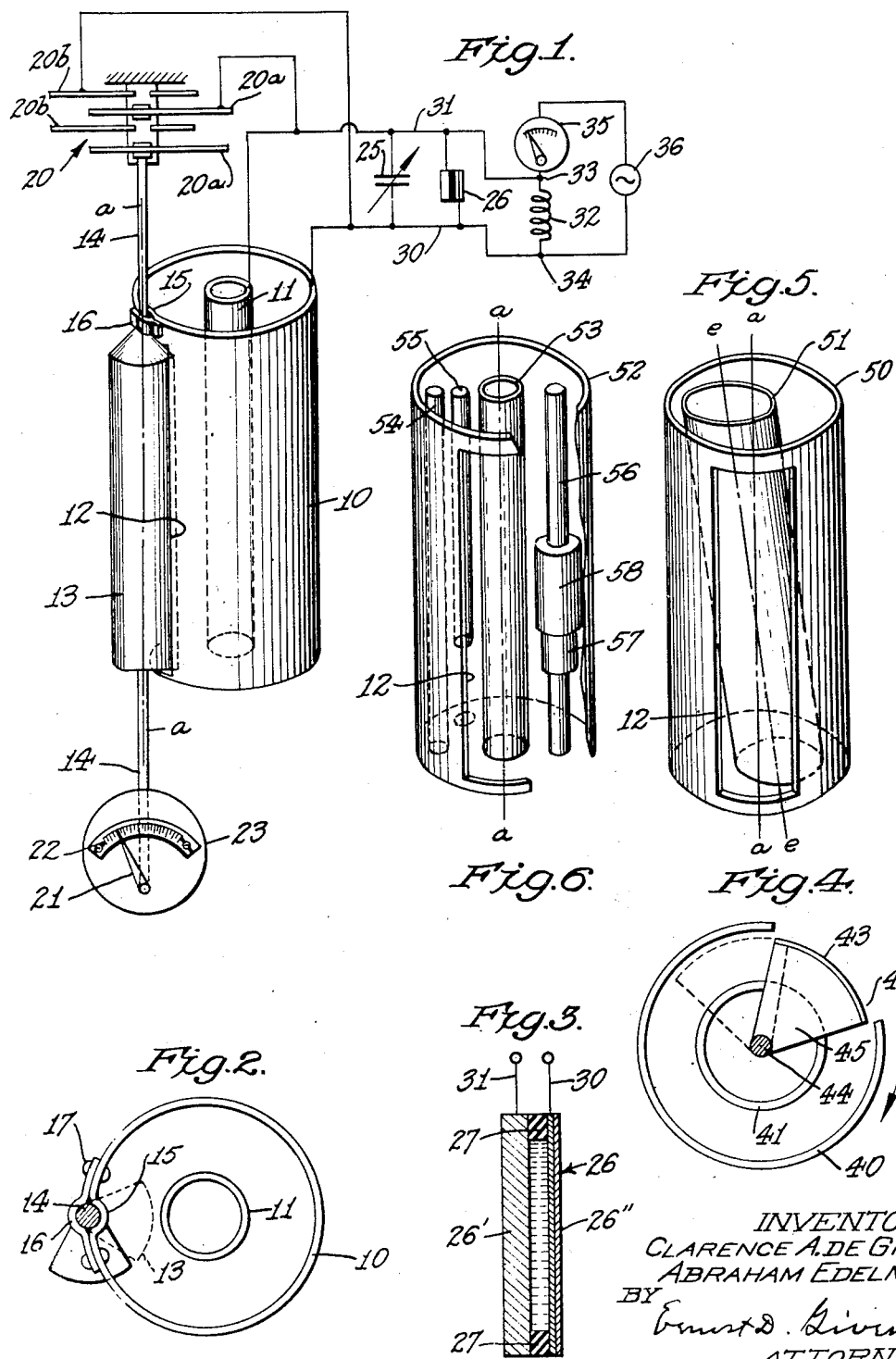

2,540,658

UNITED STATES PATENT OFFICE 2,540,658

ADJUSTABLE TRANSMITTER CONDENSER

Clarence A. de Giers, Forest Hills, and Abraham Edelman, New York, N. Y., assignors to The Liquidometer Corporation, Long Island City, N. Y., a corporation of Delaware Original application December 11, 1944, Serial No. 567,702. Divided and this application March 27, 1946, Serial No. 657,394

11 Claims. (Cl. 73—304)

The invention relates to improvements in indicating and control devices for supervising a variable physical magnitude, particularly to improvements in such devices including a transmitter condenser, the capacitance of which is controlled by variations of the level of a liquid to be measured.

Transmitter condensers of this type are placed in a container or tank containing the liquid to be measured so as to be immersed in the liquid to an extent dependent upon the liquid level. Any variation of the level of this liquid will change the condenser capacitance correspondingly, which changes are used to control the indicator of the system.

Various capacitance responsive circuit systems may be used to operate the indicator, such as electronic type circuit systems. The indicator used may be of any suitable type, for example, a milliammeter or a ratiometer. However, neither the entire circuit system nor the construction of the indicator are part of the present invention and they, therefore, need not be described in detail.

The effective range of capacitance of the transmitter condenser will be the difference between the capacitance, when the tank is "Empty" (air, for example, then being between the condenser electrodes), and the capacitance when the tank is "Full" (a liquid, such as gasoline, being then measured between the electrodes). Furthermore, in order to cause accurate readings on the indicator the transmitter condenser should have a definite capacitance value at "Empty" to produce a minimum reading on the indicator and another definite value at "Full" to indicate a maximum reading on the indicator.

It has been found that in actual field practice certain adjustments are necessary to produce the previously outlined conditions in the installation of the system and before actual measuring operation thereof. Such adjustments are required to compensate for a number of discrepancies which are normally found in liquid level indicating systems of the type described. For example, tanks of the same design will often vary slightly among themselves due to the manufacturing tolerances and methods of installation. This is particularly true of the rubber tanks used in aircraft. Other variations may be caused by discrepancies in the alignment of the transmitter condenser when installed, or in the transmitter condenser itself, in the operating circuit arrangement, the indicator or in the interconnecting wiring. Furthermore, since the function of the system is inherently dependent on the dielectric constant of the fluid to be measured, variations in this dielectric constant will also produce an error which must be compensated. This will occur when the tank is used at different times for different liquids which have respectively different dielectric constants.

One object of the invention is to provide means for adjusting the indications of the indicator at "Full" and "Empty" installations of the system and prior to actual measuring operation thereof.

Another object of the invention is to provide means for adjusting the capacitance controlling the indications of the system to correspond to the actual calibration of the indicator throughout the entire range thereof.

Another object of the invention is to provide a separate and independent means of adjustment at each end of the range of the indicating means. Such independent adjustment means will simplify the installation of the device since the entire system can be adjusted when the tank is empty and again when the tank is full, without upsetting the previously made zero setting for an empty tank.

Another object of the invention is to provide adjustment means which automatically maintain a constant "Empty" capacitance when the "Full" capacitance is adjusted for correct full indication.

Another object of the invention is to provide means automatically compensating for capacitance changes caused by variations in the temperature of the fluid to be supervised, such variation in temperature affecting the dielectric constant of the fluid and hence of the capacitance of the transmitter condenser.

Another object of the invention is to provide a novel method of first adjusting the indicating means for "Empty" reading when the tank is empty, then adjusting the indicating means for "Full" reading when the tank is filled, and finally adjusting the capacitance controlling the indicating means according to the dielectric constant of the fluid to be supervised.

Other and further objects and advantages of the invention will appear hereinafter and in the appended claims forming part of the specification.

The present application is a division of a copending application Serial No. 567,702, filed December 11, 1944 by Clarence A. de Giers and Abraham Edelman, which application is now abandoned.

In the accompanying drawings several embodi-

3 ments of the invention are shown by way of illustration and not by way of limitation.

In the drawings:

Fig. 1 shows diagrammatically an indicating and control device and system according to the invention;

Fig. 2 is a plan view of the transmitter condenser of the apparatus according to Fig. 1;

Fig. 3 is a detail view on an enlarged scale of a temperature responsive condenser included in the device according to Fig. 1;

Fig. 4 is a plan view of a modification of a transmitter condenser for an indicating device according to Fig. 1;

Fig. 5 is a second modification of a transmitter condenser, and

Fig. 6 is a third modification of a transmitter condenser.

Referring now to the drawings in detail, Fig. 1 shows diagrammatically an indicating device and system including means for adjustment at both ends of the indicator scale. The transmitter condenser constituting part of the telemetering device or system comprises a substantially cylindrical outer electrode 10 and an inner electrode 11. The outer electrode has a slot 12 parallel to its longitudinal axis. An element 13, preferably made of a material having a high dielectric constant, is mounted to pivot about an axis a—a by means of a shaft 14 so that it can be made to swing through slot 12 into and out of the space between electrodes 10 and 11, as is shown in Fig. 2 in which different positions of element 13 are illustrated by full and dotted lines. Shaft 14 can be mounted by any suitable means, for example, as shown in Fig. 2 a portion 15 of the outer electrode 10 may be shaped to form a semi-circle at the upper and lower ends of electrode 10. This semi-circle together with a bracket 16 also forming a semi-circle and fastened to electrode 10, for instance, by rivets 17 constitutes a bearing in which shaft 14 is free to rotate about the axis a—a.

As the compensating element 13 is pivoted to move a variable distance into the space between electrodes 10, 11, air for example, is displaced as a dielectric material and is replaced by the dielectric of element 13. Since the dielectric constant of the material of the element 13 is relatively high, the effective capacitance of the transmitter condenser is increased by inward movement of the element 13 as from the full line to the dotted line position, Fig. 2.

Element 13 is shown in Fig. 1 as being uniform in thickness and contour and extending substantially throughout the height of the transmitter condenser. Under this condition, the change in capacitance caused by the position of element 13 will remain constant when the fluid level in the tank changes from empty to full.

A variable auxiliary condenser 20 is mounted to follow and to be controlled by the motion of dielectric element 13. Condenser 20 comprises fixed plates 20b and variable plates 20a. The variable plates 20a are fixed to the shaft 14 so that they are rotated corresponding to a motion of element 13. The plates of condenser 20 are connected in parallel with the transmitter condenser as shown. The condenser 20 is positioned in a medium having a constant dielectric value, i. e. in air in the form shown in Fig. 1.

The capacitance of condenser 20 and its rate of change in capacitance in response to a displacement of plates 20b are so designed that they have a definite relationship to the capacitance of the transmitter condenser, as controlled by element 13, as will be more fully explained hereinafter.

In addition to the variable plates 20a of condenser 20, shaft 14 is connected to rotate a pointer 21 associated with a scale 22 on a dial 23. Scale 22 is calibrated in values of dielectric constants, so that element 13 can be set for a certain dielectric constant by placing pointer 21, for instance, by means of a knob (not shown) on the desired value of the dielectric constant. Dial 23 may be adjustably mounted as about the axis of rotation of the pointer 21, so that the angular position of the dial relative to shaft 14 can be adjusted.

A trimmer condenser 25 shown as a variable air condenser is connected across electrodes 10, 11 of the transmitter condenser.

As the dielectric constant of the fluid between the electrodes 10, 11, and hence the capacitance of the transmitter condenser will be affected by changes in temperature, it is advisable to provide an additional condenser having a temperature coefficient which will compensate for changes in the capacitance of the transmitter condenser as caused by variations in temperature. Such additional condenser is shown as a bimetal device generally designated 26 which is also connected across electrodes 10, 11 and is placed directly in the fluid to be measured or in a fluid having the same temperature so that it will be affected correspondingly to the temperature of the fluid to be supervised.

Fig. 3 shows an arrangement of such bimetal device 26 in detail. According to Fig. 3 the device comprises a metal strip or disc 26' forming one electrode of the condenser and a bimetal strip or disc 26'' forming the second electrode of the condenser. The electrodes are separated by spacers to which the bimetal element 26'' is fastened by any suitable means, the space between the two electrodes being filled with the fluid, the temperature of which is to be compensated for. As will be apparent, the bimetal element 26'' will be deformed by a change in temperature of the fluid and hence change its position relative to electrode 26', thereby automatically varying the capacitance of condenser 26 and consequently the electrical constants of the entire circuit arrangement.

Electrodes 10 and 11 of the transmitter condenser are connected by leads 30 and 31 in parallel with an inductor 32 at points 33 and 34. The current through the inductor is controlled by the various condensers included in the circuit system and measured by a milliameter 35 or other suitable instrument which is connected with points 33 and 34 through a source of alternating current 36.

The operation of the arrangement according to Figs. 1, 2 and 3 is as follows:

The purpose of the adjustment of the system is primarily to compensate for the application of the system to a tank which may from time to time be used to receive different liquids, having respectively different dielectric properties. The electrical connections are such that when the movable part 13 is moved inwardly, i. e. in a counterclockwise direction as seen in Fig. 1, the capacitance of the condenser including electrodes 10 and 11 is increased. The variable condenser 20 is electrically connected in parallel therewith but is arranged in reverse, so that as the member 13 moves inwardly to increase the capacitance between electrodes 10 and 11, the capacitance across the condenser 20 decreases correspondingly. The arrangement is such that the system is first adjusted with the tank empty by adjustment of the variable condenser 25 so that the indicator 35 will read zero. This reading remains constant as long as the tank is empty, independently of any adjustment of the member 13 and condenser 20 as the adjustment of one is arranged so as exactly to counterbalance that of the other. Thus the indicator 35 has been adjusted to read zero when the tank is empty irrespective of what liquid may eventually be placed in the tank.

When a given liquid is placed in the tank and the tank filled, there will be a definite capacitance change which will be a function of two things, first, the adjustment of the member 13 and condenser 20 on the one hand, and the dielectric value of the liquid in question on the other. It is desired that there be a certain capacitance change between "empty" and "full," which will approximate the total length of the scale of the indicator 35. This capacitance change should be preferably the same, irrespective of the liquid in the tank. The adjustment of the member 13 and condenser 20 is thus made in coordination with the dielectric constant of the liquid so that the full point as registered by the instrument 35 always corresponds with the actual capacitance change as influenced by the dielectric constant of the liquid with which the tank may be filled. Thus practically the adjustment of the indicator 23 can be calibrated in terms of dielectric constants of the liquids to be used from time to time. When this is done, all that is necessary to insure correct readings of the indicator 35 for different liquids is to rotate the shaft 14 and parts carried thereby until the pointer 21 is set to the correct dielectric constant for the liquid to be used as shown on the dial 23.

Let it be assumed that the indicator 35 controlled by a transmitter condenser according to Figs. 1 and 2 is to be adjusted for installation with a certain tank.

Then, first, trimmer condenser 25 is adjusted for zero reading on the indicator 35 when the tank is empty. Second, the tank is filled with a fluid having a known dielectric constant, for example, with gasoline having a dielectric constant $k=2.11$. Third, if, when the tank is completely filled, it is found that the indicator does not read "Full," adjustment is made by moving element 13 in or out, as required, to increase or decrease the effective capacitance of the condenser until the indicator 35 reads "full," thus correcting the reading of the indicator.

It will be apparent that this third adjustment might also cause the "Empty" tank capacitance to change so that if the tank were emptied again the indicator would no longer read zero as previously adjusted. However, variable condenser 20, which automatically follows any movement of element 13, and is designed in relation to the geometry of the electrodes of the transmitter condenser, will accurately compensate for an increase or decrease in capacitance due to element 13 when the tank is empty. For example, if element 13 is moved deeper between electrodes 10 and 11 thus increasing the capacitance of the transmitter condenser, part of this increase will be counterbalanced by a simultaneous and corresponding decrease in the capacitance of variable condenser 20. The balance point is for an empty tank, for which condition an increase in total capacitance of the system due to the displacement of element 13 is just neutralized by an equivalent decrease due to condenser 20.

Fourth, dial 23 is set so that pointer 21 indicates $k=2.11$ on scale 22. In this way the scale 22 may be calibrated in terms of dielectric constant of different liquids.

If the tank is now to be used for a fluid having a different known dielectric constant, for example, for a gasoline having $k=1.9$, it is only necessary to re-set the pointer by rotating shaft 14 and hence resetting element 13 for $k=1.9$ and correspondingly adjusting condenser 20 to obtain correct readings on the indicator 35 without any further or independent adjustment.

The bimetal condenser 26 will automatically compensate for changes in temperature.

Element 13 may, of course, have a shape different from the shape illustrated and it may be made of conductive material and be in effect a part of condenser plate 10. The application of a transmitter condenser, as shown in Figs. 1 and 2 is not limited to an association with the illustrated circuit, but any other suitable circuit may be used, such as a circuit of the electronic type.

Fig. 4 shows another transmitter condenser according to the invention based on the same principle as the transmitter condenser shown in Figs. 1 and 2. According to Fig. 4, the condenser comprises an outer electrode 40 and an inner electrode 41. The outer electrode has a slot 42 which may extend throughout the entire length of the electrode. In order to vary the capacitance of the transmitter condenser, an adjustable dielectric element 43 is employed which is adjustable relative to the slot 42 so that it covers an adjustable fraction of this slot or the entire slot. Such an adjustment can be accomplished by any suitable means, for instance, a shaft 44 may be provided to which brackets or arms 45 are fastened at the upper and lower end of the condenser. These brackets 45 support element 43 permitting a rotation of this element within the space between the electrodes 40, 41 as illustrated in the drawings.

As will be apparent from the description of Fig. 1, the "Full" capacitance of the transmitter condenser will be controlled by the position of element 43 relative to slot 42. It will reach a minimum in the position shown in full lines and increase in response to a rotation of element 43 away from slot 42 if the dielectric constant of element 43 is higher than the dielectric constant of the fluid to be measured. When the dielectric constant of element 43 is lower than the dielectric constant of the fluid to be measured, the change in capacitance will be reversed.

The transmitter condenser shown in Fig. 4 may be used in connection with the circuit shown in Fig. 1 or in connection with any other suitable circuit.

In the previous description, it has been assumed that the relative position of the condenser electrodes remains unchanged when the telemetering system is adjusted during installation and prior to measuring operations. However, it is also practical and under certain conditions advantageous to employ a transmitter condenser with relatively movable electrodes.

Fig 5 shows a transmitter condenser having an outer electrode 50 and an inner electrode 51.

It should be understood that the electrodes 50 and 51 correspond to the electrodes 10 and 11 of Fig. 1 and that the condenser of Fig. 5 may be connected to the system shown in Fig. 1. For sake of clarity and simplicity of illustration, element 13 has not been shown in conjunction with Fig. 5, but it should be understood that it may be arranged in the same manner as has been shown in Fig. 1.

According to Fig. 5, the axis e—e of inner electrode 51 is tilted relative to axis a—a of outer electrode 50 so that electrode 51 is eccentric at both ends but essentially concentric at the center for the position illustrated. The condenser capacitance per unit height, and therefore the change of capacitance with change of liquid level, will thus be greater at both ends than at the center.

Such non-uniform rate of change in capacitance in conjunction with the adjustment means as illustrated in Fig. 1 permits the compensation of all variations due to manufacturing tolerances and methods of installation, and the attainment of an adjustment of the transmitter condenser capacitance corresponding accurately to the calibration of the indicator throughout the entire measuring range.

It will be apparent that a displacement of the electrodes relative to each other permits a great variety of adjustments, for instance, the inner electrodes may be adjusted so that it is concentric at one end and eccentric at the other end or the inner electrode may be displaced parallel to the axis of the outer electrode.

While in the previous description reference is made to a displacement of the inner electrode it will be evident that the same effect may be attained by adjusting the outer electrode.

Fig. 6 shows another modification of a transmitter condenser which may be employed instead of the transmitter condenser illustrated in Fig. 1. The condenser according to Fig. 6 comprises an outer electrode 52 and an inner electrode 53. Element 13 (Fig. 1) previously mentioned may be operatively connected with electrode 52 in the same manner as has been described for the transmitter condenser shown in Fig. 1.

In order to adjust the transmitter capacitance independently of and in addition to the capacitance control by the adjustment means shown in Fig. 1, a rod 54 having a dielectric constant greater than 1.00 is inserted between electrodes 52 and 53 and by its presence increases the "Empty" capacitance of the condenser. If the dielectric constant of rod 54 is the same as the dielectric constant of the liquid to be supervised, then the full capacitance of the condenser will remain in effect, no matter how much of rod material is employed. On the other hand, if the dielectric constant of rod 54 is smaller (or larger) than that of the liquid, then the full capacitance of the condenser will be decreased (or increased) accordingly. Additional rods, such as rods 55 and 56 may be provided as variations of rod 54. Rod 55 is shorter than rod 54 and rod 56 includes an enlargement 57 and a slidable spacer 58. Both rods 55 and 56 are made of dielectric material as is rod 54. By causing the dielectric material to occupy specific portions of space between the electrodes at each liquid level, the liquid when rising between the electrodes 52 and 53 is excluded to the extent that the dielectric material of the rods is present, and so the change in capacitance due to change in liquid level is decreased. By such means, corrections may be applied to any part of the transmitter condenser to make its calibration agree with a known requirement. To obtain maximum freedom in making such corrections it is sometimes advantageous to include rods such as 54, 55 and 56 in the design for "normal" conditions, then by removing or adding rods or spacers a correction in either increasing or decreasing direction may be made.

Adjustable transmitter condensers, as shown in Figs. 5 and 6, are more fully disclosed in the aforementioned copending patent application Serial No. 567,702 filed December 11, 1944.

It should be understood that the electrodes of the illustrated transmitter condensers may be pre-shaped to conform to a desired change in capacitance with change in liquid level, and that the change in capacitance with change in level may be designed to have different values at different levels. For all such designs, it is difficult to manufacture many similar assemblies without including undesirable variations in capacitance. It is the purpose and function of the adjustments previously described to correct for such manufacturing variations. For description purposes only, therefore, the electrodes are shown as concentric tubes of uniform cross-section, and it should be understood that the same considerations apply to all other shapes of electrodes.

In the previous description it has been assumed that the liquid to be measured is a non-conducting one. However, a system according to the invention is also applicable to measuring conducting fluids. In this case, one or both of the condenser electrodes are coated with a non-conducting material which then forms the dielectric material and in combination with the fluid shows an "apparent" dielectric constant. Otherwise, the action of a transmitter condenser of this type is the same as previously described for the illustrated modifications of the transmitter condenser.

While the invention has been described in detail with respect to certain preferred examples and embodiments, it will be understood by those skilled in the art after understanding the invention that various changes and modifications may be made without departing from the spirit and scope of the invention, and it is intended, therefore, in the appended claims, to cover all changes and modifications.

What is claimed is:

1. A device for indicating the liquid contents in a container, comprising an electric indicating means for indicating the liquid contents, a variable transmitter condenser positioned in said container to be immersed in the liquid therein to an extent dependent upon the liquid level and having a capacitance affected by the liquid level, means connecting said transmitter condenser in a circuit with said indicating means for controlling the indications thereof in response to the capacitance of said transmitter condenser, control means for adjustably varying the transmitter condenser capacitance independently of capacitance change caused by a change of the liquid level, a second variable condenser positioned in a medium having a constant dielectric value and connected in said circuit, and means operatively connecting said control means and said second variable condenser so as simultaneously to cause opposite changes in the capacitances of said second variable condenser and said transmitter condenser.

2. A device for indicating the liquid contents in a container, comprising an electric indicating means responsive to capacitance changes for indicating the liquid contents, a variable transmitter condenser positioned in said container to be immersed in the liquid therein to an extent dependent upon the liquid level and having a capacitance affected by the liquid level, means connecting said transmitter condenser in a circuit with said indicating means for controlling the indications thereof in response to the capacitance of said transmitter condenser, control means for adjustably varying the transmitter condenser capacitance independently of capacitance change caused by a change of the liquid level, a second variable condenser positioned in a medium having a constant dielectric value and connected in said circuit, means operatively connecting said control means and said second variable condenser so as simultaneously to cause a decrease of the capacitance of said second variable condenser in response to an increase of the transmitter condenser capacitance as caused by said control means, and vice versa, and an adjustable trimmer condenser connected in said circuit for providing a zero adjustment for said indicating means.

3. A device for indicating the liquid contents in a container, comprising an electric indicating means for indicating the liquid contents, a variable transmitter condenser positioned in said container to be immersed in the liquid therein to an extent dependent upon the liquid level and having a capacitance dependent upon the liquid level, means connecting said transmitter condenser in a circuit with said indicating means for controlling the indications thereof in response to the capacitance of said transmitter condenser, control means for adjustably varying the transmitter condenser capacitance independent of capacitance change caused by a change of the liquid level, a second variable condenser positioned in a medium having a constant dielectric value and connected in said circuit, means operatively connecting said control means and said second variable condenser so as simultaneously to cause a decrease of the capacitance of said second variable condenser in response to an increase of the transmitter condenser capacitance caused by said control means, and vice versa, and a third variable condenser connected in said circuit including means for changing its capacitance in response to variations in temperature, said third variable condenser being arranged to be exposed to a temperature corresponding to the temperature of the liquid to be supervised for controlling the indications of said indicating means by compensating for changes in the capacitance of said circuit caused by changes in temperature of said liquid.

4. A device for indicating the liquid contents in a container, comprising an electric indicating means for indicating the liquid contents, a variable transmitter condenser having spaced electrodes arranged to be immersed in the liquid, the level of the liquid between the electrodes affecting the condenser capacitance, means connecting said transmitter condenser in a circuit with said indicating means for controlling the indications thereof, adjustable control means capable of affecting the condenser capacitance by its position relative to said electrodes for varying the transmitter condenser capacitance independently of capacitance change thereof caused by a change of the liquid contents of said container, a second variable condenser positioned in a medium having a constant dielectric value and connected in said circuit, means operatively connecting said control means and said second variable condenser in such manner as to cause a decrease of the capacitance of said second variable condenser in response to an increase of the transmitter condenser capacitance as caused by said control means, and vice versa, a third variable condenser including means for changing its capacitance in response to variations in temperature, said third variable condenser being connected in said circuit and arranged to be exposed to a temperature corresponding to the temperature of the liquid to be supervised for controlling the indications of said indicating means to compensate for changes in the capacitance of the circuit caused by changes in temperature of the liquid, and an adjustable trimmer condenser connected in said circuit for controlling the indications of said indicating means to provide a zero adjustment therefor.

5. A device for indicating the liquid contents in a container, comprising an electric indicating means for indicating the liquid contents, a variable transmitter condenser having spaced electrodes arranged to be immersed in the liquid, the level of the liquid between the electrodes affecting the condenser capacitance, means connecting said transmitter condenser in a circuit with said indicating means for controlling the indications thereof in response to capacitance change in said circuit, a control element having a dielectric constant different from that of the liquid and capable of affecting the condenser capacitance by its position relative to said electrodes, supporting means disposed in said container and movable supporting said control element in the space between said electrodes for adjusting the position of said control element relative to said electrodes, thereby varying the capacitance of said condenser independently of changes in its capacitance caused by variations of the liquid contents to be supervised, a second variable condenser positioned in a medium having a constant dielectric value and connected in said circuit, and means operatively connecting said supporting means and said second variable condenser in such manner as to cause said second variable condenser to follow a displacement of said control element by a decrease of the capacitance of said second variable condenser in response to an increase of the transmitter condenser capacitance, and vice versa.

6. A device for indicating the liquid contents in a container, comprising an electric indicating means for indicating the liquid contents, a variable transmitter condenser having spaced electrodes arranged to be immersed in the liquid, the level of the liquid between said electrodes affecting the condenser capacitance, means connecting said condenser in a circuit with said indicating means for controlling the indications thereof, one of said electrodes of said transmitter condenser having a slot formed therein, a dielectric control element having a dielectric constant different from that of air and that of said liquid, support means mounted in the container and movably supporting said control element in a position extending through said slot into the space between the condenser electrodes and for adjusting the position of said control element relative to the electrodes and thereby varying the capacitance of said transmitter condenser independently of changes in the capacitance thereof caused by variations in the level of the liquid contents to be supervised, a second variable condenser positioned in a medium having a constant dielectric value and having a stationary and a movable electrode connected in said circuit, and means operatively connecting said support means and said second variable condenser and so as to displace the movable electrode of said second variable condenser in response to a movement of said dielectric element in such manner as to cause a decrease of the capacitance of said second variable condenser in response to an increase of the transmitter condenser capacitance caused by a displacement of said dielectric element, and vice versa.

7. A device for indicating the liquid contents in a tank, comprising an electric indicating means for indicating the liquid contents, a variable transmitter condenser having spaced electrodes arranged to be immersed in the liquid, the level of the liquid between the electrodes affecting the condenser capacitance, means connecting said condenser in a circuit with said indicating means for controlling the indications thereof, a dielectric control element having a dielectric constant different from that of air and that of the liquid, support means disposed in the tank and pivotally supporting said control element and constructed and arranged to pivot the control element within the space between the electrodes of said transmitter condenser for changing the position of the control element relative to the electrodes, so as to vary the capacitance of said condenser independently of changes in the capacitance thereof caused by variations of the level of the liquid contents to be supervised, a second variable condenser positioned in a medium having a constant dielectric value and connected in said circuit, and means operatively connecting the supporting means and said second variable condenser, said connecting means causing said second variable condenser to follow a displacement of said control element in such manner as to decrease the capacitance of said second variable condenser in response to an increase of the transmitter condenser capacitance, said last named changes in capacitance being selected to balance each other at the capacitance of the transmitter condenser when the tank is empty.

8. A device for indicating the liquid contents in a tank, comprising an electric indicating means for indicating the liquid contents, a variable transmitter condenser having spaced and substantially concentric cylindrical electrodes arranged to be immersed in the liquid, the level of the liquid between the electrodes affecting the condenser capacitance, means connecting said condenser in a circuit with the indicating means for controlling the indications thereof, one of the electrodes of said transmitter condenser having a slot formed therein, a dielectric control element having a dielectric constant different from that of air and that of the liquid, means disposed within the tank and pivotally supporting said control element coaxially with the condenser electrodes so that it may be adjustably moved to and from a position in radial alignment with said slot, and so as to vary the position of the control element relative to said electrodes in such manner as to change the capacitance of the transmitter condenser independently of changes in the capacitance thereof caused by variations in the liquid contents to be supervised, a variable air condenser having a stationary and a movable electrode connected in said circuit, means operatively connecting said dielectric control element and said variable air condenser and so as to displace the movable electrode of said variable air condenser in response to a movement of said dielectric element in such manner as to cause a decrease of the capacitance of said variable air condenser in response to an increase of the transmitter condenser capacitance effected by a displacement of said dielectric element, said last-named changes in capacitance being selected to balance each other at the capacitance of the transmitter condenser when the tank is empty, and an adjustable trimmer condenser connected in said circuit for adjusting the capacitance controlling the indicating means to provide a zero adjustment therefor.

9. A device for indicating the liquid contents in a tank, comprising electric indicating means responsive to capacitative changes for indicating the liquid contents, a transmitter condenser having spaced electrodes arranged to be immersed in the liquid, the level of liquid between the electrodes affecting the condenser capacitance, means connecting said condenser in a circuit with said indicating means for controlling the indications thereof, one of said electrodes having an elongate slot in its surface, a dielectric control element having a dielectric constant different from that of the liquid to be supervised, a shaft rotatably supported by the electrode having said slot and supporting said control element pivotally within said slot to vary the position of the control element relative to said electrodes, so as thereby to change the capacitance of said condenser independently of changes in the capacitance thereof caused by variations of the liquid level to be supervised, and a variable air condenser having a fixed and a movable electrode connected in said circuit, the movable electrode being supported by said shaft for displacement relative to the fixed electrode, said control element and said movable electrode being supported on the shaft in a relative position causing opposite changes in the capacitances of said variable air condenser and of the transmitter condenser in response to a rotation of said shaft, said last mentioned changes in capacitance being selected to balance each other when said tank is empty.

10. A device according to claim 9, comprising in addition, a pointer rotatable with said shaft, a scale bearing member supported for cooperation with the pointer, and means for adjusting the position of said scale member relative to the pointer.

11. A device for indicating the liquid contents in a tank, comprising electric indicating means for indicating the liquid contents, a variable transmitter condenser having spaced electrodes arranged to be immersed in the liquid, the level of liquid between the electrodes affecting the condenser capacitance, means connecting said condenser in circuit with said indicating means for controlling the indications thereof, one of said electrodes having a slot formed therein, a control element of electrically conducting material electrically connected to the electrode which is provided with the slot, support means mounted in the tank and movably supporting said control element for varying the position of the control element relative to said slot so as thereby to change the capacitance of the condenser independently of changes in the capacitance thereof as caused by a variation of the liquid level, a second variable condenser positioned in a medium having a constant dielectric value and connected in said circuit, and means operatively connecting said support means and said second variable condenser to cause said second variable condenser to follow a displacement of said control element in such manner as to decrease the capacitance of said second variable condenser in response to an increase of the transmitter condenser capacitance, and vice versa.

CLARENCE A. DE GIERS.
ABRAHAM EDELMAN.

REFERENCES CITED

The following references are of record in the file of this patent:

UNITED STATES PATENTS

| Number | Name | Date |
|---|---|---|
| 1,525,778 | Hellmann | Feb. 10, 1925 |
| 2,081,914 | Dow | June 1, 1937 |
| 2,188,628 | Freystedt | Jan. 30, 1940 |
| 2,300,562 | Freystedt | Nov. 3, 1942 |
| 2,409,073 | Sias et al. | Oct. 8, 1946 |